June 13, 1939.  E. T. VEST  2,162,141
QUICK CHANGE EDGE TRIMMER
Filed June 24, 1938
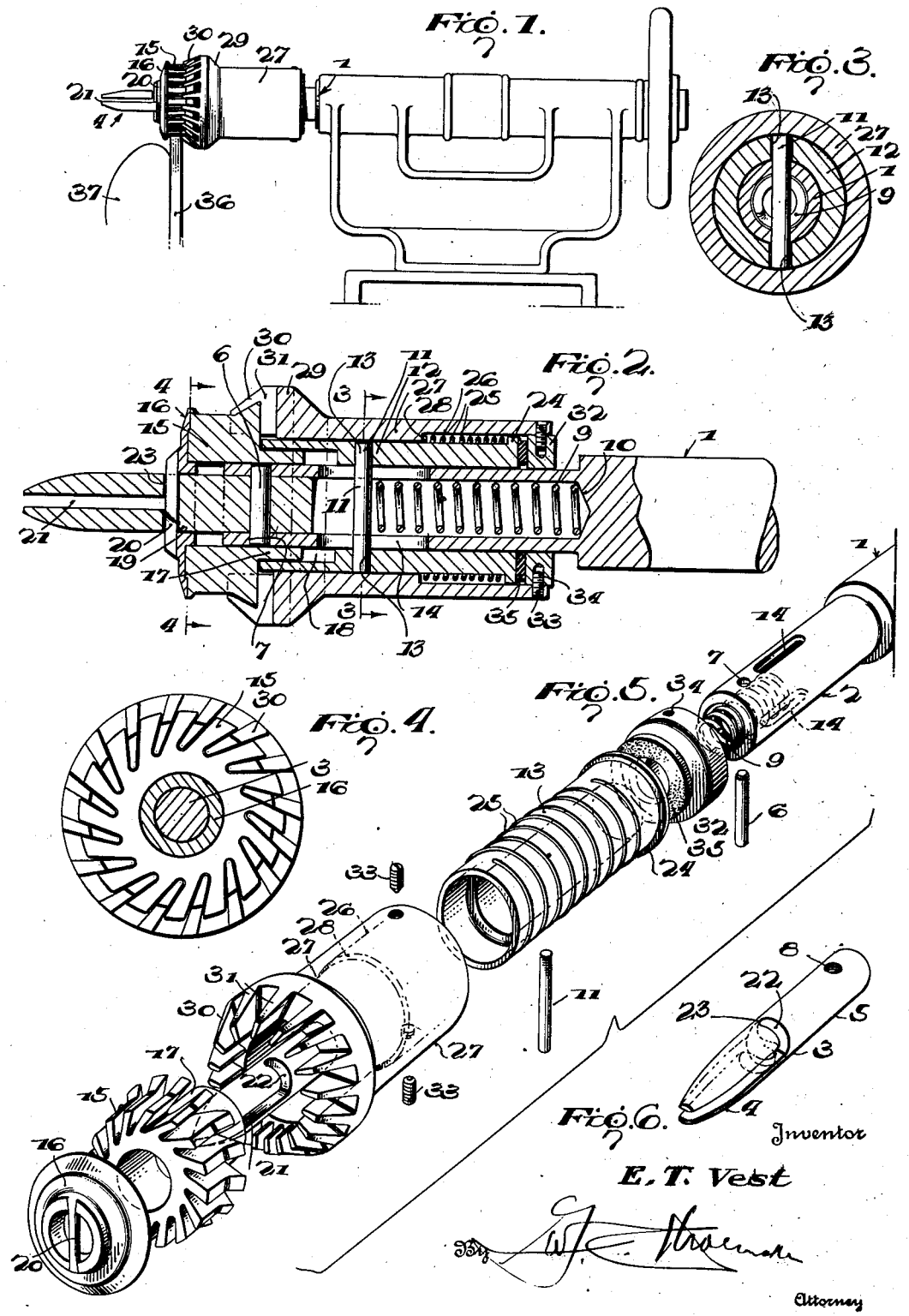
Inventor
E. T. Vest
Attorney Patented June 13, 1939

2,162,141

UNITED STATES PATENT OFFICE 2,162,141

QUICK CHANGE EDGE TRIMMER

Edward Thomas Vest, Richmond, Va.

Application June 24, 1938, Serial No. 215,677

7 Claims. (Cl. 12—92)

The invention relates to a quick change edge trimmer.

One of the objects of the present invention is to improve the construction of the means for securing the cutter retaining or guard disk to the trimmer shaft so as to obtain a quick removal and replacement of the edge trimming cutter and at the same time provide a strong, sturdy, and comparatively inexpensive construction for detachably securing the standard edge trimming cutter to the trimmer shaft.

Another object of the invention is to provide the means for mounting an automatically adjustable cutter guard and for enabling different sizes of edge trimming cutters to be secured to the trimmer shaft without affecting the tension of a compression spring for yieldably maintaining the cutter guard in engagement with the edge trimming cutter so that the cutter guard will be free to yield to any inequalities in the thickness of the sole of the shoe being trimmed, whereby the cutter guard will permit such inequalities in sole thicknesses to pass it without liability of accidentally forcing the shoe into engagement with the cutter and scarring or otherwise marring the shoe being trimmed.

A further object of the invention is to provide means for yieldably mounting the cutter guard unit and for permitting inward and outward movement of the same to accommodate standard edge trimming cutters of different sizes so that the size of the cutter being used will not affect the tension of the compression spring which maintains the cutter guard yieldably in engagement with the sole trimming cutter.

With the above and other objects in view, the invention consists in the construction and novel combination and arrangement of parts hereinafter fully described, illustrated in the accompanying drawing and pointed out in the claims hereto appended, it being understood that various changes in the form, proportions and minor details of construction, within the scope of the claims, may be resorted to without departing from the spirit or sacrificing any of the advantages of the invention.

In the drawing:

Figure 1 is a side elevation of a portion of a machine provided with an edge trimmer constructed in accordance with the present invention.

Figure 2 is a central longitudinal sectional view of the edge trimmer on a slightly enlarged scale.

Figure 3 is a transverse sectional view taken on the line 3—3 of Figure 2.

Figure 4 is a transverse sectional view taken on the line 4—4 of Figure 2.

Figure 5 is a perspective view of the edge trimmer, the parts being separated and arranged in position for assembling.

Figure 6 is a detail perspective view of the lock stud of the trimmer shaft.

In the accompanying drawing, in which is illustrated the preferred embodiment of the invention, the edge trimmer comprises in its construction a trimmer shaft 1 provided with an outer reduced tubular portion 2 receiving within its outer end a lock stud 3 having an outer tapered portion 4 and an inner cylindrical shank portion 5 fitting snugly within the interior of the tubular portion or section 2 of the trimmer shaft and secured within the same by a lock stud pin 6 detachably arranged in transversely aligned perforations 7 of said tubular section 2 and passing through a transverse perforation 8 in the shank of the lock stud and having a force fit in the shaft 1 to retain it in place. The pin 6 rigidly and detachably secures the lock stud within the outer end of the tubular portion or section 2 of the trimmer shaft.

The tubular portion 2 of the trimmer shaft receives and forms a housing for a compression spring 9, which bears at its inner end against the end wall 10 of the bore or longitudinal opening of the tubular portion, and the outer end of the compression spring 10 engages and urges outwardly a transversely disposed pin 11 of an automatically adjustable sleeve 12, which is slidably mounted on the tubular outer portion of the trimmer shaft, and which has a force fit to retain it in place. The terminal portions of the pin 11 are arranged in transversely aligned perforations 13 in the sleeve 12, and the said pin passes through and is slidably mounted in opposite longitudinal slots 14 in the tubular portion 2 of the trimmer shaft. The compression spring 9, by engaging the pin 11, urges the slidable sleeve 12 outwardly and maintains the same yieldably in engagement with the inner side of a standard sole trimming cutter 15 and holds the cutter in frictional engagement with an outer guard disk. The hub portion 17 extends into an interior annular recess 18 in the outer end of the automatically adjustable sleeve 12. The edge trimmer is adapted to receive standard sole trimming cutters of different sizes, and the interior annular recess 18 is adapted to accommodate the hub extension or portion 17 of a standard sole trimming cutter of any size. The compression spring 9 is of sufficient strength to produce frictional engagement between the sleeve 12, the guard disk 16 and the cutter 15 for holding the cutter firmly connected with the trimmer shaft and for causing the cutter 15 to rotate with the trimmer shaft.

The guard disk 16, which is provided with an inner face of the usual construction for engaging the sole trimming cutter at the outer side thereof, is arranged on the lock stud and is provided with a central opening 19 to receive the same, and it has a transverse pin or bar 20 fixed to its outer face and extending across the central opening 19 and adapted to fit in a bayonet slot 21 in the lock stud. The tapered outer portion of the lock stud forms a guide for enabling the cutter to be readily placed on the trimmer shaft and the guard disk to be readily arranged on the lock stud. The bayonet slot 21 has opposite inner transverse portions 22 and opposite inner terminal portions 23. The guard disk is then rotated slightly to carry the pin into the transverse terminal portions of the bayonet slot, and the compression spring 9 will cause the locking portion 20 to engage the terminal portions or seats 23 of the bayonet slot and will hold the locking portion 20 of the guard disk firmly in said seats, so that there will be no liability of the guard disk and the cutter becoming accidentally loose on the trimmer shaft during the operation of the edge trimmer. At the same time, the guard disk may be readily forced inwardly and partially rotated to return the locking portion 20 to the longitudinal portion of the bayonet slot to permit the cutter to be readily removed when it is desired to change cutters.

The automatically adjustable cutter engaging sleeve is provided at its inner end with an exterior annular flange 24 forming a shoulder or abutment for the inner end of a compression spring 25 arranged on the exterior of the automatically adjustable sleeve 12 and located within an interior annular recess 26 of a cutter guard 27. The compression spring 25 bears against the annular flange 24 and the shoulder 28 formed by the interior annular recess 26, and is adapted to yieldably maintain the cutter guard in engagement with the cutter 15. The cutter guard consists of a sleeve and its inner portion is counterbored to form the interior annular recess 26, but the latter may be formed in any other desired manner. The cutter guard is provided at its outer end with a head or enlargement 29 provided with teeth 31 arranged to fit between the cutting teeth of the sole trimming cutter and interlock the cutter guard with the cutter and thereby cause the cutter guard to rotate with the trimmer shaft.

The cutter guard is detachably retained on the automatically adjustable sleeve by a removable collar 32 fitted within the inner end of the cutter guard and slidable therewith and detachably secured to the same by screws 33 passing through transversely aligned perforations in the inner end of the cutter guard and engaging threaded sockets 34 in the collar 32. The screws 33 may be readily removed when it is desired to detach the collar 32 and remove the cutter guard from the automatically adjustable sleeve. A washer 35 is preferably interposed between the collar 32 and the inner end of the automatically adjustable sleeve. When the parts of the edge trimmer are assembled, the cutter 15 conceals the lock stud pin 6 and the cutter guard conceals the pin 11.

The edge trimmer is adapted for trimming the sole 36 of a shoe 37 in the usual manner, as indicated in Figure 1 of the drawing, and, should the cutter guard encounter any inequality in the thickness of the sole of the shoe, it will be forced inwardly or rearwardly and permit such inequality to pass without causing the displacement of the shoe, as would be the case were the cutter guard fixed with relation to the sole trimming cutter, and there will be no liability of a shoe being accidentally marred or scarred by being displaced by the cutter guard. In this operation of the cutter guard, the compression spring 25 will be compressed against the annular flange 24 by the inward or rearward movement of the cutter guard from the position illustrated in Figure 2 of the drawing, and as soon as such inequality in the thickness of the sole of the shoe has passed beyond the cutter, the compression spring will move the cutter guard outwardly to the normal position illustrated in Figure 2 of the drawing.

What is claimed is:

1. An edge trimmer including a trimmer shaft having an outer tubular portion, a lock stud secured within the tubular portion of the shaft and having an outer tapered portion projecting beyond the shaft and adapted to form a guard disk guide and provided with a bayonet slot having opposite transverse and terminal portions, a guard disk having an opening receiving the lock stud and provided with a fixed transverse locking portion extending across said opening and arranged in the bayonet slot and adapted to be carried by a partial rotary movement of the guard disk into the transverse and terminal portions of the slot, said guard disk being adapted to engage a sole trimming cutter at the outer side thereof, and yieldable means carried by the trimmer shaft for engaging said cutter at the inner side thereof for holding the cutter against the guard disk.

2. An edge trimmer including a trimmer shaft having a tubular portion, means for detachably securing a sole trimming cutter on the tubular portion of the trimmer shaft, an expansion spring arranged within the tubular portion, an adjustable sleeve arranged on the exterior of the tubular portion of the trimmer shaft and having means engaged by the compression spring for holding the sleeve against the cutter at the inner side thereof and for permitting the sleeve to engage cutters of different sizes, a cutter guard mounted on the automatically adjustable sleeve, and means for yieldably holding the cutter guard in engagement with the sole trimming cutter.

3. An edge trimmer including a trimmer shaft having a tubular portion, means for detachably securing a sole trimming cutter on the tubular portion of the trimmer shaft, an expansion spring arranged within the tubular portion, an adjustable sleeve arranged on the exterior of the tubular portion of the trimmer shaft and having means engaged by the compression spring for holding the sleeve against the cutter at the inner side thereof and for permitting the sleeve to engage cutters of different sizes, said sleeve being provided at its outer end with an interior annular recess adapted to receive the hub portions of standard sole trimming cutters of different sizes, a cutter guard mounted on the automatically adjustable sleeve and carried by the same, and yieldable means also carried by the said sleeve for holding the cutter guard in engagement with the cutter.

4. An edge trimmer including a trimmer shaft having an outer tubular portion provided with longitudinal slots, means for detachably securing a sole trimming cutter on the outer end of said tubular portion of the trimmer shaft, a compression spring arranged within the tubular portion, a sleeve mounted on the exterior of the tubular portion, a transverse pin mounted on the sleeve and operating in the said slots of the tubular portion and engaged by the spring whereby the sleeve is maintained yieldably in engagement with the cutter at the inner side thereof, said cutter being clamped between the sleeve and the means for detachably securing the cutter to the cutter shaft.

5. An edge trimmer including a trimmer shaft having an outer tubular portion provided with longitudinal slots, a lock stud having a shank portion arranged within the outer end of said tubular portion, a transverse pin piercing the tubular portion of the shank and concealed by a sole trimming cutter, a guard disk arranged on the lock stud and having an interlocking connection therewith and adapted to engage the cutter at the outer side thereof, a sleeve arranged on the exterior of the tubular portion of the trimmer shaft and bearing against the inner side of the cutter and provided with a pin arranged in said slots, a compression spring arranged within the tubular portion of the trimmer shaft and bearing against the pin thereof for holding the sleeve against the inner side of the cutter, and a cutter guard yieldably mounted on and carried by the sleeve and engaging the cutter and concealing the pin of said sleeve.

6. An edge trimmer including a trimmer shaft having a tubular portion, means for detachably securing a sole trimming cutter on said tubular portion, a spring arranged within the tubular portion, a sleeve mounted on the exterior of the tubular portion and having means engaged by the spring for holding the sleeve against the cutter at the inner side thereof, said sleeve being provided at its inner end with an exterior shoulder, a cutter guard mounted on the sleeve and provided at its inner portion with an annular recess, a compression spring arranged within the annular recess and engaging said shoulder and the inner wall of the recess for holding the cutter guard in engagement with the cutter, and means carried by the inner end of the cutter guard for limiting the forward movement of the cutter guard on the sleeve when the cutter is removed.

7. An edge trimmer including a trimmer shaft having a tubular portion, means for detachably securing a sole trimming cutter on said tubular portion, a spring arranged within the tubular portion, a sleeve mounted on the exterior of the tubular portion and having means engaged by the spring for holding the sleeve against the cutter at the inner side thereof, said sleeve being provided at its inner end with an exterior shoulder, a cutter guard mounted on the sleeve and provided at its inner portion with an annular recess, a compression spring arranged within the annular recess and engaging said shoulder and the inner wall of the recess for holding the cutter guard in engagement with the cutter, a collar arranged within the inner end of the cutter guard, and fastening means detachably securing the collar to the cutter guard, said collar limiting the outward movement of the cutter guard when the cutter is removed.

EDWARD THOMAS VEST.